Figure 1:
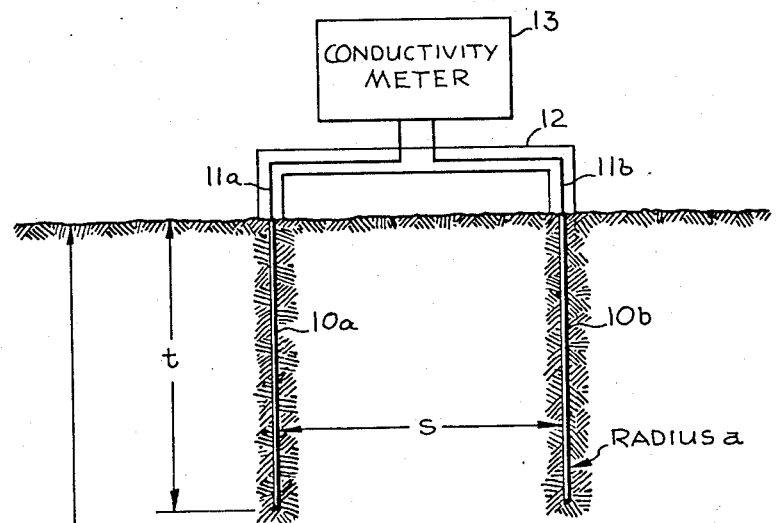

March 17, 1964     R. N. GHOSE     3,125,717
GEOPHYSICAL APPARATUS INCLUDING A TWO-WIRE OPEN-ENDED
TRANSMISSION LINE EMBEDDED IN THE EARTH FOR
MEASURING IMPEDANCE CHARACTERISTICS
OF THE EARTH
Filed Jan. 5, 1960

RABINDRA N. GHOSE
INVENTOR.

BY Allen E. Bohney
ATTORNEY 3,125,717
GEOPHYSICAL APPARATUS INCLUDING A TWO-WIRE OPEN-ENDED TRANSMISSION LINE EMBEDDED IN THE EARTH FOR MEASURING IMPEDANCE CHARACTERISTICS OF THE EARTH
Rabindra N. Ghose, Los Angeles, Calif., assignor, by mesne assignments, to Space-General Corporation, Glendale, Calif., a corporation of California
Filed Jan. 5, 1960, Ser. No. 531
2 Claims. (Cl. 324—1)

The present invention relates in general to the art of geophysical exploration and more particularly relates to a method and apparatus utilizing transmission line techniques for conducting geological surveys to determine the characteristics of the earth.

Exploration geophysics may be defined as the art of applying the physical sciences to the study of the structure and composition of those layers of the earth which are sufficiently shallow to be exploited by man. From a less sophisticated and more practical point of view, it is the art by which oil, gas and various kinds of mineral and ore deposits, as well as subterranean water reservoirs, are sought and located, what is commonly referred to as "prospecting." In relatively recent times, this art has become important for still another reason, namely, because knowledge of the electrical characteristics of the earth, such as its conductivity and permeability, are oftentimes essential in the design of certain types of communication links, particularly those using the earth as a transmitting medium.

The desirability of using the earth as a propagating medium may be found in the fact that subsurface communication systems would, in general, be simpler, more effective, less expensive, and more permanent than existing conventional systems. More specifically, communication systems constructed on the surface of the earth are subject to the disruptive and destructive forces of both nature and man. Thus, it is well known that phenomenae such as sun spots will often disrupt communications for a significant period of time and that tornadoes, heavy snows and other such weather conditions will damage or destroy communication links, such as transmission lines and communication installations. Furthermore, fires and explosions, both of which are encountered in times of war, also produce destructive effects of the types mentioned.

It is thus seen that many good reasons exist for determining the electrical characteristics of the earth's subsurface strata. In connection with subsurface electromagnetic communication systems, for example, where the transmitting and receiving antennas are imbedded several feet or even several hundred feet underground, the electrical characteristics of the earth at the transmitter and receiver sites should be known for proper system design. Specifically, the electromagnetic field and, hence, the signal strength at the receiving station decreases, for such systems, at the rate of $\alpha\sqrt{\sigma}$ db per meter of depth of the transmitter and receiver antennas, $\sigma$ being the conductivity of the earth expressed in mhos per meter and $\alpha$ being equal to $\sqrt{0.3 f_{kc}}$, where $f_{kc}$ is the operating frequency of the system in kilocycles. Those skilled in the art will immediately recognize from what has been said that for an underground antenna installation buried at a considerable depth, a relatively slight error in the assumption of the value of $\sigma$ may put such a communication system out of commission.

It is, therefore, an object of the present invention to provide a method and apparatus for accurately measuring the electrical properties of the earth.

It is another object of the present invention to provide a method and apparatus for quickly and accurately measuring the conductivity and permeability of the earth with increasing depth.

The above-stated objects may be attained by providing a transmission line technique and apparatus for determining the electrical characteristics of a cross-section of the earth. In accordance with the basic concept of the present invention, various impedance measurements instrumentally made at the surface of the earth at the input end of a transmission line imbedded in the earth are respectively equated to the various terms in a mathematical derivation of the input impedance of a pair of current carrying wires imbedded in a conducting or semi-conducting medium, such as the earth. By so doing, both the depthwise conductivity and permeability of the earth are obtained.

More particularly, according to one embodiment of the present invention, a transmission line is sunk vertically downward into the earth, the transmission line conductors preferably being in intimate contact with the earth. In a conventional manner, a signal is then propagated down the transmission line and the resistive and reactive components of the input impedance thereafter noted by means of a meter connected across the input end of the line, which is at the surface. The measured impedance components are then equated to the real and imaginary terms of the input impedance equation which, as mentioned previously, was mathematically derived. By using the apparatus mentioned and, further, by following the steps delineated, the conductivity and permeability downward through the earth may be expeditiously and accurately determined.

The novel features which are believed to be characteristic of the invention, both as to its organization and method of operation, together with further objects and advantages thereof, will be better understood from the following description considered in connection with the accompanying drawing in which an embodiment of the invention is illustrated by way of example. It is to be expressly understood, however, that the drawing is for the purpose of illustration and description only and is not intended as a definition of the limits of the invention.

Figure 2:
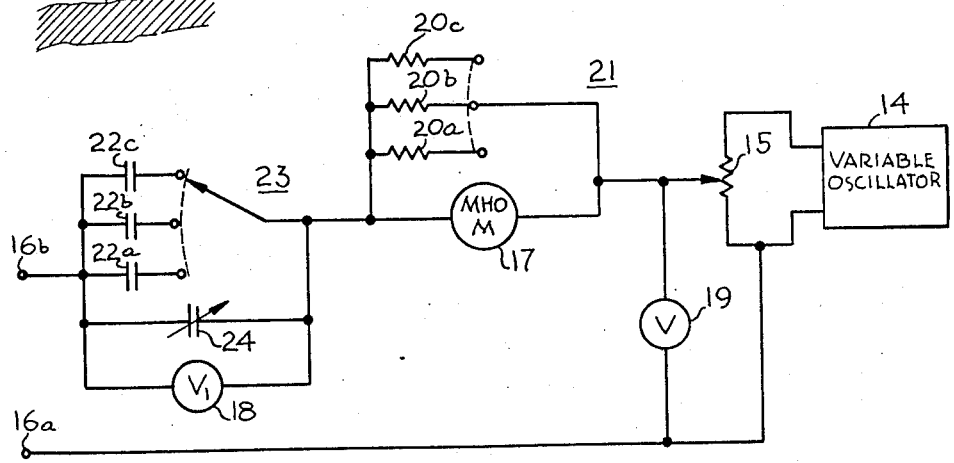

FIGURE 1 is a schematic representation of the method and apparatus of an embodiment of the present invention; and FIGURE 2 is a detailed circuit of a conductivity meter used in the embodiment of FIG. 1.

Referring now to the drawing and in particular to FIGURE 1 therein, the embodiment shown includes a pair of transmission line wires, designated 10a and 10b, imbedded vertically downward in the earth and in intimate contact therewith. In the present instance conductors 10a and 10b are spaced apart by a distance "S" and are preferably of a rod-like nature having a radius "a" and a length "t," as shown in the figure. Conductors 10a and 10b are respectively connected at their input ends to a pair of horizontal wires 11a and 11b which are prevented from electromagneticaly radiating by means of a magnetic shield 12 which surrounds the wires. The reason for using the shield will be more clearly understood later. Accordingly, suffice it to say for the present that by surrounding wires 11a and 11b with such a shield, thereby confining the electromagnetic fields radiated therefrom, the accuracy of the measurements is greatly enhanced. Finally, wires 11a and 11b connect to a conductivity meter 13 by means of which pertinent electrical measurements of the earth's properties are made. As will be seen later, meter 13 may be calibrated and adjusted to provide direct readings irrespective of the electrical length of the transmission line.

For the purpose of considering meter 13 in greater particularity, reference is now made to FIGURE 2 wherein the meter is shown in detail. As shown therein, the meter includes a variable low-frequency oscillator 14 whose output is connected across a rheostat 15, one terminal of the rheostat and, therefore, one terminal of the oscillator, being connected to an output terminal of the conductivity meter itself, designated 16a. A mho meter 17 is connected between the movable center tap of rheostat 15 and a voltmeter 18, the other end of the voltmeter being connected to the other output terminal of the conductivity meter, designated 16b. Output terminals 16a and 16b are respectively connected to horizontal wires 11a and 11b. Another voltmeter 19 is connected between the rheostat center tap and output terminal 16a and, therefore, it measures the amplitude of the signal developed at the output of the rheostat and applied to the rest of the conductivity meter circuit.

The conductivity meter further includes a plurality of resistors 20a, 20b and 20c connected in series with a multi-terminal switch which is generally designated 21, the series combination of resistors and switch being in shunt with the mho meter. In other words, with the aid of switch 21, resistors 20a, 20b and 20c are selectively connected across the mho meter. Resistors 20a, 20b and 20c are utilized to provide different scales for the mho meter and, therefore, they have different values of resistance. Furthermore, it should be mentioned that the number of resistors across mho meter 17 depends upon the number of its scales and, hence, is not limited to three. Accordingly, there may be less or more than three resistors across the meter.

In a similar manner, a plurality of capacitors 22a, 22b and 22c are connected in series with a multiterminal switch generally designated 23, the series combination of capacitors and switch being in shunt with voltmeter 18. Stated differently, by means of switch 23, any one of capacitors 22a, 22b and 22c may be connected between meter output terminal 16b and mho meter 17, between which voltmeter 18 is also connected. A trimming capacitor 24 is also connected between terminal 16b and mho meter 17 and is used to provide a fine adjustment of capacitance for capacitors 22a, 22b and 22c. Here again, more or less than the three capacitors shown may be used in the circuit, depending on the range of capacitance it is desired to cover.

In connection with mho meter 17, it should be noted that the meter is basically an ammeter whose scales have been calibrated to provide direct readings in terms of conductivity, that is, in mhos per meter, and it will become apparent later how this this has been made possible. Finally, it should be noted that the values of resistance of resistors 20a, 20b and 20c, as well as the value of the internal resistance of the mho meter, are very small compared to the resistance of the earth that may be expected.

In considering the operation of the above-described apparatus for measuring ground conductivity at various underground depths, it should first be reiterated that transmission line techniques are used wherein the input impedance of a pair of current carrying conductors imbedded in the ground is measured and then compared to the input impedance that has been mathematically derived for such an arrangement. Assuming that the conductive medium in which transmission lines 10a and 10b are placed is homogeneous and extends to an infinite depth, the mathematically derived equation for input impedance is:

$$Z_\text{in} \simeq \frac{1}{\pi \sigma t} ln \frac{S}{a} \left[1 + j\frac{\omega \mu \sigma t^2}{3}\right]$$

where $\sigma$ = average conductivity of the earth
$\omega = 2\pi f$, $f$ being the frequency of the signal used
$\mu$ = average permeability of the earth, and
$t$ = the depth to which the transmission line conductors extend downward into the earth, where $t \ll$ the free space wavelength of the signal used.

The other quantities in the equation have previously been defined.

The manner in which the equation for input impedance presented above is derived is as follows:

$$Z_\text{in} \simeq Z_0 \tanh \gamma t$$

where $Z_0$ is the characteristic impedance of the transmission line formed by the two cylindrical electrodes placed inside the conducting earth, $\gamma$ is the propagation constant along the electrodes, and $t$ is the length of the electrodes.

Since the transmission line is in a conducting medium $$Z_0 = \frac{1}{\pi} \sqrt{\frac{\mu}{\epsilon - j\frac{\sigma}{\omega}}} ln\left(\frac{S}{a}\right)$$

where $S$ = distance between the electrodes
$a$ = radius of each electrode
$\sigma$ = conductivity of earth
$\epsilon$ = dielectric constant of the earth
$\mu$ = permeability of the earth When $\sigma \gg \omega \epsilon$, as is usually the case for the frequency region of interest here, $$Z_0 \simeq \frac{1}{\pi} \sqrt{\frac{j\omega\mu}{\sigma}} ln \frac{S}{a}$$

The propagation constant $\gamma$ for this case is given by $$\gamma \simeq j\beta \simeq j(\omega^2 \mu \epsilon - j\omega\mu\sigma)^{1/2}$$

or $$\gamma \simeq j[\omega\mu(\omega\epsilon) - j\omega\mu\sigma]^{1/2}$$

Here again, since $\sigma \gg \omega \epsilon$ for the frequency region of interest here, the first term under the radical may be ignored with very little error resulting therefrom. Hence.

$$\gamma \simeq j\sqrt{-j\omega\mu\sigma}$$

If the length of the electrode is very small such that $$\tanh \gamma t \simeq \gamma t + \frac{(\gamma t)^3}{3}$$

one obtains by substitution that $$Z_\text{in} \simeq \frac{1}{\pi} \sqrt{\frac{j\omega\mu}{\sigma}} \frac{ln S/a}{\sqrt{j\omega\mu\sigma t}} \left[1 + \frac{j\omega\mu\sigma t^2}{3}\right]$$

Simplifying, $$Z_\text{in} \simeq \frac{1}{\pi \sigma t} ln \frac{S}{a} \left[1 + \frac{j\omega\mu\sigma t^2}{3}\right]$$

It will be recognized that the input impedance given by the equation is in complex form, the "real" part, namely $$\frac{1}{\pi \sigma t} ln \frac{S}{a}$$

corresponding to the earth's resistance and the "imaginary" part, namely, $$\frac{1}{\pi \sigma t} ln \frac{S}{a} \frac{\omega\mu\sigma t^2}{3}$$

corresponding to the earth's reactance which, it has been determined, is inductive. In other words, $$R = \frac{1}{\pi \sigma t} ln \frac{S}{a}, \text{ and}$$

$$X_\text{L} = \frac{1}{\pi \sigma t} ln \frac{S}{a} \frac{\omega\mu\sigma t^2}{3}$$

It is thus seen that if the resistance of the earth is measured, the conductivity of the earth, $\sigma$, can thereafter be obtained and that if the reactance is later measured, the permeability, $\mu$, can also be obtained. In other words, the real and imaginary parts of the input impedance presents an opportunity for directly measuring the average conductivity and the average permeability of the ground for a vertical cross-section of the earth ranging from the earth's surface to some depth "$t$."

Direct measurements may be obtained by means of the conductivity meter apparatus shown in detail in FIG- URE 2 and involves adjusting oscillator 14 until it is generating a signal at a frequency $f_1$. The center tap of rheostat 15 is then adjusted until voltmeter 19 indicates that the output from the rheostat is 1 volt. At this point, switch 23 is adjusted until the inductive reactance of the earth's input impedance is tuned out by the capacitor connected into the circuit by the switch. In other words, the earth's resistance and inductance is, in essence, connected between meter terminals 16a and 16b and is in series, therefore, with the capacitor selected from capacitors 22a, 22b and 22c for connection into the meter circuit. The capacitor selected will, of course, be of such a value that the capacitive reactance in the circuit will be substantially equal to the inductive reactance brought into the circuit by the earth. A series tuned circuit will be the result and, as is well known, the effective impedance of such circuits is resistive only, the resistance here being that of the earth. Consequently, for all practical purposes, the 1 volt signal out of rheostat 15 is developed across the resistance R in the circuit due to the earth. The current through the circuit and, therefore, through mho meter 17, is equal to $E_\sigma/R$ where $E_\sigma$ is the applied voltage and R is the resistance in the circuit, here the resistance of the earth. Since $E_\sigma$ has been made 1 volt, the current is equal to $1/R$ which, is will be recognized; is conductivity. Accordingly, it will now be understood why it was previously stated that meter 17 is basically an ammeter whose scales are calibrated to read conductivity in terms of mhos per meter rather than amperes.

Of course, in the event that the applied voltage $E_\sigma$ out of rheostat 15 is greater than 1 volt, then mho meter 17 would be used as an ammeter instead. The resistance in the circuit may then be found by dividing $E_\sigma$ by I, that is $E_\sigma/I$, where I is the current flowing through the circuit as indicated by meter 17. The value of resistance R thusly obtained is then equated to the real part of the above-presented equation for input impedance and the conductivity is thereby obtained. Hence, once R is measured, $$R = \frac{1}{\pi \sigma t} ln \frac{S}{a}$$

from which $$\sigma = \frac{1}{\pi R t} ln \frac{S}{a}$$

Since R, t, S and a are known, $\sigma$ is thereby easily calculated. It is seen, however, that the whole process is very greatly expedited by making $E_\sigma$ equal to 1 volt for in that case $\sigma$ can be read directly, as explained above.

Once $\sigma$ is known, it then becomes a rather simple matter to obtain the permeability factor, $\mu$, of the earth. To do this, a reading of the voltage $E_\mu$, as indicated by voltmeter 18, is taken. The voltage is that developed across the capacitive reactance in a series tuned circuit and, therefore, as will be recognized by those skilled in the electronic arts, is also the voltage developed across the inductive reactance in the circuit which, it will be remembered, is introduced in the present circuit by the proximity of the earth. Accordingly, $X_L$, the inductive reactance, is equal to the voltage $E_\mu$ divided by I, that is:

$$X_L = E_\mu / I$$

However, $$I = \frac{E_\sigma}{R}$$

and since $E_\sigma$ has been adjusted to be equal to 1 volt, then $$I = \frac{1}{R} = \sigma$$

Consequently, by substitution, $$X_L = \frac{E_\mu}{\sigma}$$

Since $\sigma$ was previously read from mho meter 17 and $E_\mu$ is presently indicated by voltmeter 18, $X_L$ may readily be computed. Once $X_L$ is known, its values is set equal to the imaginary part of the input impedance equation, that is, $$X_L = \frac{1}{\pi \sigma t} \frac{\omega \mu \sigma t^2}{3} ln \frac{S}{a}$$

The permeability $\mu$ is then solved for and when this is done, $$\mu = \frac{3 X_L \pi \sigma t}{\omega \sigma t^2 ln S/a}$$

All the quantities on the right-hand side of the equation are known so that $\mu$ can be easily calculated.

It will be recognized by those skilled in the art that the inductive reactance may be found in ways other than that described above. Thus, for example, meter 17 may be adapted to include an impedance meter for measuring the absolute value of impedance of the earth. Then, determining the earth's resistance in the manner described, the inductive reactance $X_L$ can thereafter be quickly ascertained from the equation:

$$X_L = \sqrt{Z_{in}^2 - R^2}$$

One way for making the impedance measurement is to connect an impedance meter in parallel with meter 17 and then connect one meter or the other across the input end of the transmission line by means of a switch arrangement.

Having obtained the earth's conductivity and permeability at one frequency, the frequency of the signal out of oscillator 14 is then changed to some other value $f_2$ and the procedure delineated above followed once again until another set of values for conductivity and permeability are obtained. The same procedure is followed at successively different frequencies until all the desired information has been accumulated. Since operation at different frequencies corresponds ot different electrical lengths "t" of transmission line, a corresponding number of scales may be used for meter 17, one scale for each frequency, to permit direct readings of the meter at each frequency used. The reason for using different frequencies will now be explained.

Due to the phenomena known as skin effect, signals at different frequencies produce telluric currents that penetrate the earth to corresponding different depth. To illustrate this point, the depths to which currents at different frequencies may typically penetrate the earth are as follows:

| Frequency in c.p.s.: | Depth in feet |
| --- | --- |
| 0 | ∞ |
| 1 | 3300 |
| 4 | 1650 |
| 100 | 825 |
| 1000 | 83 |

It will be obvious, therefore, that in order to obtain a measure of the average conductivity of the earth to any one depth, the signal frequency must be such that the earth currents set up by the signal can penetrate to substantially that depth.

The fact that signals at different frequencies will penetrate to different depths can be exploited since the subterranean level at which a change in conductivity occurs and, consequently, the level at which a discontinuity in the form of a mineral deposit or water reservoir occurs, can thereby easily be reckoned. Hence, when the conductivity of the earth at some level changes from that above it, the subsurface currents at that level or depth are affected thereby, the general effect being a change in the measured input impedance of the transmission line formed by conductors 10a and 10b.

Stated differently, the input impedance is affected if there is a discontinuity of the electromagnetic parameters of the ground at a depth $t_1$, as shown in FIGURE 1, the reason being that the reflection of electromagnetic waves from the layer at level $t_1$ will be sufficiently appreciable so as to affect the input impedance of the transmission line, as mentioned. By knowing the frequency at which a change in input impedance is first noted and, further, by knowing the depth to which a signal at this frequency will penetrate the earth, the downward distance to the discontinuity can be ascertained with relatively good accuracy. Thus, by way of example, it will be seen from the above table that if a marked change in input impedance first occurs when the signal frequency is 100 c.p.s., and not at any lower frequency, then the discontinuity that caused the deviation is located approximately 825 feet below the surface. Thus, if the discontinuity was located as shown in FIGURE 1, then the distance $t_1$ would be approximately equal to 825 feet. Moreover, from the nature and degree of the change in the input impedance, it is possible to accurately guess at the type of discontinuity involved, that is, whether it is an ore deposit, a water reservoir or some other kind of deposit. by "nature and degree" of the change is meant whether the resistive or inductive part of the input impedance has changed, or both, and the extent of the change, because the new values of conductivity and permeability as compared to the old values will provide a clue as to the identity of the discontinuity.

It was previously assumed in deriving the equation for input impedance that the length "$t$" of the transmission line was small enough such that $$\tanh \gamma t \simeq \gamma t + \frac{(\gamma t)^3}{3}$$

could be assumed. If, on the other hand, $\sigma t$ is large, then $\tanh \sigma t \simeq 1$, and $$Z_{in} \simeq \frac{1}{\pi}\sqrt{\frac{j\omega\mu}{\sigma}} ln\frac{S}{a}$$

or $$Z_{in} \simeq \frac{1}{\pi}\sqrt{\frac{\omega\mu}{2\sigma}} ln\frac{S}{a} + j\frac{1}{\pi}\sqrt{\frac{\omega\mu}{2\sigma}} ln\frac{S}{a}$$

Finally, it should be mentioned with emphasis that one of the most important features of the present invention is that it provides a means of geological prospecting to determine the existence of water bed or other minerals without any drilling up to the layer.

Having thus described the invention, what is claimed as new is:

1. Geophysical apparatus comprising: a two-wire open-ended transmission line sunk into the earth to a predetermined depth; and means coupled to said transmission line at the input end thereof for measuring the input impedance of said line over a range of frequencies, said means including a variable oscillator for applying signals to said transmission line over said range of frequencies; and first and second circuit arrangements connected between said variable oscillator and said transmission line, said first and second circuit arrangements respectively being adapted to measure the resistive and reactive components of the input impedance of said transmission line over said range of frequencies.

2. Geophysical apparatus comprising: a transmission line imbedded in the earth in a substantially vertical direction and in electrical contact therewith, the input end of said line being at the surface of the earth; a variable oscillator for generating signals over a range of frequencies; means connected to said variable oscillator for adjusting the amplitude of signals therefrom, said means being adapted to maintain the amplitude of said signals at 1 volt; an ammeter adapted to provide direct readings of conductivity connected to said means; a plurality of capacitors and a multi-terminal switch connected in series between said ammeter and the input to said transmission line, said capacitors being selectively connected into the apparatus for tuning out the inductive reactance of the earth over said range of frequencies; and a voltmeter device connected in parallel with a selected capacitor, said voltmeter reading a maximum when the capacitive reactance is substantially equal to the inductive reactance of the earth.

References Cited in the file of this patent
UNITED STATES PATENTS

| | | |
|---|---|---|
| 681,654 | McClatchey | Aug. 27, 1901 |
| 1,808,397 | Billotte et al. | June 2, 1931 |
| 2,228,223 | Bays | Jan. 7, 1941 |
| 2,375,022 | Morris et al. | May 1, 1945 |
| 2,766,421 | Wait et al. | Oct. 9, 1956 |

OTHER REFERENCES

American Standard Definitions of Electrical Terms, Published by A.I.E.E., section 35.40.215, page 125.